Aug. 29, 1967     D. M. NYMAN     3,338,933
METHOD OF REFINING WOOL FAT
Filed Feb. 17, 1964
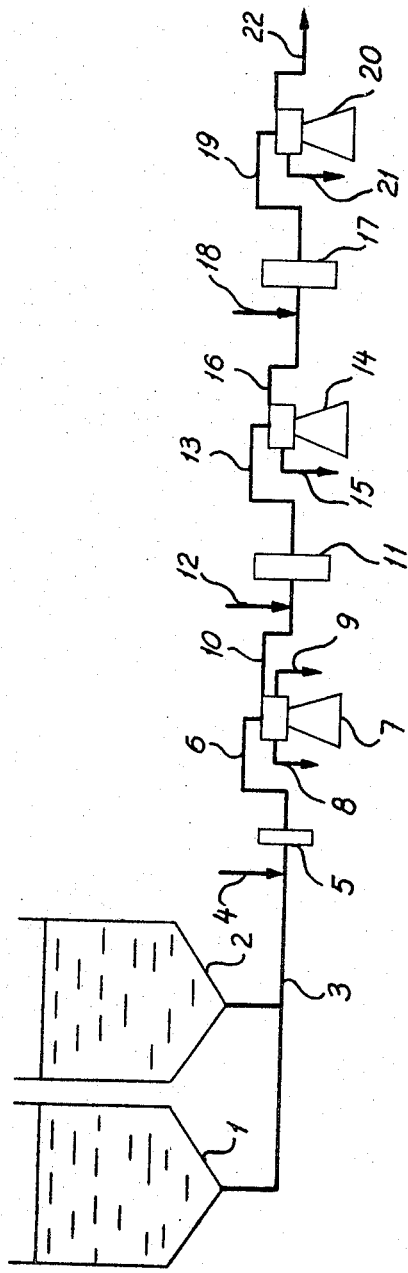
INVENTOR.
Doris M. Nyman
BY
Davis, Hoxie, Faithfull & Hapgood
Attorneys

United States Patent Office 3,338,933
Patented Aug. 29, 1967

3,338,933
METHOD OF REFINING WOOL FAT
Doris M. Nyman, deceased, late of Bromma, Sweden, by Per Svedenhult, administrator, Stockholm, Sweden, assignor to Aktiebolaget Separator, Stockholm, Sweden, a corporation of Sweden
Filed Feb. 17, 1964, Ser. No. 345,514
Claims priority, application Sweden, Feb. 21, 1963, 1,881/63
8 Claims. (Cl. 260—423)

The present invention relates to a method for refining wool fat, in which the wool fat is subjected to a first treatment with acid.

Wool fat has been refined heretofore by a method consisting of the following steps:

(1) Treatment with hydrochloric acid, sulphuric acid or phosphoric acid.

(2) One or several washings with water, the water being separated from the fat after every washing.

(3) Neutralization with an alkali lye, possibly containing an addition of alcohol, whereupon the soapstock formed during the process is separated from the fat.

(4) One or several washings with water, possibly containing an admixture of alcohol, the water being separated from the fat after each washing.

(5) Bleaching with hydrogen peroxide.

(6) One or several washings with water, the last wash-water often being separated by centrifugation.

(7) Possibly drying.

The bleaching according to step 5 often brings about an increased acidity of the fat. A content of free fatty acids higher than 0.05% is generally unacceptable in pharmaceutical lanolin.

According to the present invention it is now possible to reduce considerably the number of processing steps and thus reduce the refining costs, and at the same time the refining process is less time-consuming and gives a higher quality of the final product. More precisely, the method according to the invention is characterized in that the wool fat, directly after the acid treatment, is treated with a bleaching agent and, directly after the bleaching, is neutralized with an alkali lye and washed thereafter.

If the wool fat is treated with oxalic acid, the calcium and magnesium compounds contained in the wool fat are effectively precipitated and can be separated from the wool fat by a mechanical process, preferably by centrifugation. Thus the ash-content of the wool fat is reduced. Phosphoric acid has a similar effect and, in co-operation with hydrogen peroxide used as a bleaching agent, also has a color-improving effect. A mixture of both acids is preferably used in order to obtain an optimum ash-content reductions and color improvement.

The bleaching is preferably carried out with hydrogen peroxide together with a strong mineral acid such as phosphoric acid. The mineral acid prevents an excessively rapid decomposition of the hydrogen peroxide into free oxygen and water. Thus, the liberated oxygen will be used more efficiently for the bleaching and not wasted unnecessarily. The alkali added for the subsequent neutralization liberates the remaining quantities of oxygen from the hydrogen peroxide. In the present method, the wool fat is given the occasion to be bleached in both acid and alkaline medium, so that more bleaching of the wool fat is effected than in the case of a bleaching carried out after the neutralization.

The bleaching with hydrogen peroxide increases the content of free fatty acids in the fat. Owing to the fact that the bleaching is now carried out prior to the neutralization, a neutral final product is also obtained.

The neutralization is preferably carried out with an alkali lye to which a demulsifying agent, such as an alcohol (e.g., isopropanol) or an alkali carbonate or another electrolyte, has been added. Moreover, the neutralization is preferably carried out with a lye excess of about 25 to 50% over the quantity which is stoichiometrically required for the complete neutralization of the total acidity of the fat (the added acid as well as the free fatty acids) so that the final product is neutralized as much as possible.

The neutralization of the acid added to the fat without separation of the acid prior to the neutralization has the advantage, when treating the fat with phosphoric acid or oxalic acid, that the ash-content in the final product is particularly low. This is due to the fact that the precipitation of the calcium and magnesium compounds of said acids becomes particularly effective in an alkaline medium.

The fat is preferably separated from added products and impurities before being washed, preferably in a centrifuge. In order to render the washing still more effective, it may be carried out twice, a separation being carried out after each washing. An emulsification during the washing can be counteracted by the admixture of an alcohol, preferably isopropanol, to the washing water. The washed fat may thereafter be dried in the usual way.

The invention is described more in detail below, reference being made to the attached drawing in which the single illustration is a schematic view of a plant for carrying out the new method. The numerical values given in the following description are chosen by way of example.

More exactly, the drawing shows a plant for semi-continuous operation. Reference numerals 1 and 2 designate wool fat containers which alternately feed a pipe 3. When one of the containers has been emptied through a pipe 3 the other container should be filled with wool fat which is to be fed through the pipe 3. The wool fat in the container is heated up to 85° C. and mixed with phosphoric acid in the usual concentration in a quantity constituting 0.25% by volume calculated in relation to the wool fat. A stirrer (not shown) in the container keeps the fat sufficiently stirred. After the acid has acted for 5 to 10 minutes, 30% hydrogen peroxide is added in a quantity of 1% by volume calculated in relation to the wool fat. After the hydrogen peroxide has acted for 30 minutes, the fat is discharged into the pipe 3 where a caustic soda lye is added through a pipe 4 to an excess of 25 to 50% over what is needed for neutralizing the previous admixtures and the free fatty acids contained in the fat. The lye is mixed with sodium carbonate or isopropanol in order to counteract emulsification.

The fat then passes through a disk mixer 5, where the lye is intimately mixed with the fat, and is fed from the mixer through a pipe 6 into a self-opening sludge centrifuge 7. Calcium phosphate and magnesium phosphate as well as other solid impurities are periodically discharged through the sludge outlets, as indicated by arrow 8, and the soap-stock formed is discharged through a special outlet 9. Separated wool fat passes through a pipeline 10 to a knife mixer 11. Before the wool fat enters the latter, it is admixed with wash water introduced through a pipeline 12 to which wash water isopropanol has been added to counteract emulsification tendencies.

The wool fat washed in the mixer 11 passes through a pipeline 13 to a centrifuge 14 and is separated in the latter from the washing liquid which is discharged through an outlet 15. The separated fat is then conveyed through a pipeline 16 and once more mixed with wash water introduced through a pipe 18 before it is fed into a further knife mixer 17. This wash water is also admixed with isopropanol. The wool fat washed in the mixer 17 is conveyed through a pipeline 19 to a centrifuge 20 from which the washing liquid is discharged through an outlet 21 and the separated wool fat is discharged to an outlet pipe 22.

The latter may lead to a conventional drier (not shown) for drying the refined wool fat.

Acid and bleaching agent may also be added continuously.

The following table shows the improvement of the bleaching which results from its being carried out in an acid medium as well as in an alkaline medium.

|  | Lovibond determination, 2″ cell | | |
|---|---|---|---|
|  | Yellow | Red | Blue |
| Crude fat treated with 0.25% by volume of phosphoric acid and 1% by volume of hydrogen peroxide and washed | 70 | 10 | 2 |
| The fat washed in the manner indicated above, neutralized and washed | 70 | 8.4 | 1.0 |
| The crude fat treated with 0.25% by volume of phosphoric acid and 1% by volume of hydrogen peroxide, neutralized and washed | 70 | 5.2 | 0.6 |

What is claimed is:

1. A method of refining wool fat which comprises the steps of subjecting the wool fat to a first treatment with acid selected from the group consisting of phosphoric and oxalic acids, treating the wool fat, directly after said acid treatment, with a bleaching agent to bleach the wool fat, neutralizing the wool fat, directly after said bleaching, with alkali lye, and then washing the wool fat.

2. The method according to claim 1, in which said bleaching agent is hydrogen peroxide.

3. The method according to claim 1, in which said neutralization is effected with a mixture of said alkali lye and alcohol.

4. The method according to claim 1, in which said neutralization is effected with a mixture of said alkali lye and an electrolyte.

5. The method according to claim 1, in which said neutralization is effected with said lye in an excess of about 25 to 50% over the quantity which is stoichiometrically required for complete neutralization of the total acidity of the fat.

6. The method according to claim 1, in which the fat is separated from impurities and soapstock after said neutralizing and prior to said washing.

7. The method according to claim 1, comprising also the steps of separating the washing liquid from the wool fat after said washing, and repeating said washing and separating steps.

8. The method according to claim 1, in which said washing is carried out with water containing an alcohol.

References Cited

UNITED STATES PATENTS 2,483,414  10/1949  Henderson _____ 260—424

OTHER REFERENCES

Boyle: Manufacturing Chemist, 23 (1952), pp. 460–62.

ALEX MAZEL, *Primary Exaimner.*

HENRY R. JILES, *Examiner.*

R. BOYD, *Assistant Examiner.*